INVENTORS
ARTHUR PETER BOUDREAU
EDWIN LEE HUNTER
BY Featherstonhaugh & Co.
ATTORNEYS INVENTORS
ARTHUR PETER BOUDREAU
EDWIN LEE HUNTER
BY Featherstonhaugh & Co.
ATTORNEYS

INVENTORS
ARTHUR PETER BOUDREAU
EDWIN LEE HUNTER

April 18, 1961  E. L. HUNTER ET AL  2,980,788
WELDING PROCESS
Filed July 22, 1957  5 Sheets-Sheet 5

INVENTORS
ARTHUR PETER BOUDREAU
EDWIN LEE HUNTER
BY- *Featherstonhaugh & Co.*
ATTORNEYS

United States Patent Office 2,980,788
Patented Apr. 18, 1961

2,980,788
WELDING PROCESS

Edwin L. Hunter, 51 Eastlawn Ave., Riverside, Ontario, Canada, and Arthur P. Boudreau, 2404 Alexis Road, Windsor, Ontario, Canada Filed July 22, 1957, Ser. No. 673,239

7 Claims. (Cl. 219—78)

This invention relates to a machine for welding and in particular to a machine for performing a number of welds at spot locations simultaneously.

Such welding is performed by providing a battery of welding tips in an arrangement and number corresponding to the spot locations desired; means being provided for moving the battery toward and away from a workpiece. A surface is provided for supporting the workpiece during contact by the respective welding tips since such contact is made under a considerable amount of pressure. The surface so supporting the workpiece is adapted to supply an electrical connection between pairs of welding tips, half of which are connected to an electrically positive terminal and half to an electrically negative terminal. The current flow with relation to a pair of welding tips is: from a welding tip, through a welding spot location on the workpiece to a conducting portion of the support surface; across a conductor in the support to a second conducting portion on the support surface which corresponds to a second welding tip, and through the workpiece from said portion to a negative welding tip.

The tips are moved approximately simultaneously into contact with the workpiece so that all the spot location welds are performed at approximately the same time and thereafter the tips are moved out of contact again. A number of connections are required for each welding tip. One electrical line must be connected to supply positive or negative welding current. Water lines must be connected and the apparatus surrounding the tip must be designed so that the water may supply cooling thereto. Means must be provided to actuate the tips toward and away from the workpiece and oil or air lines must be connected to this means to correctly actuate the tips. Thus it will be seen that the electrical and water lines and possibly also the actuating lines must be so connected as to allow for the relative movement of the tips.

By "fluid actuable" I include both "hydraulically" and "pneumatically actuable."

In present apparatus the electrical and cooling connections are made near the tips themselves. In a battery of four, six or more tips the presence of the large number of lines for each tip and the relative proximity of the tip, creates a tangled mass of connections which makes maintenance on any individual connection, and makes operation of the machine itself, difficult.

It is therefore an object of this invention to provide an apparatus designed wherein the water and electrical connections for the welding tip are made to a location remote from the working area. In this way the working area is kept comparatively unobstructed and the connections and the apparatus adjacent the remote location can be designed for easy access to the individual elements.

In present apparatus, materials of magnetic and conductive nature are used in the vicinity of the conducting path toward the welding tip. Such magnetic materials cause undesirable electrical and conductive losses.

It is therefore an object of this invention to use material of non-magnetic nature in the vicinity of the conducting path.

In present apparatus if a particular welding operation requires six, eight or more tips then the tips must be arranged at the work location and the electric, coolant and hydraulic or pneumatic connections must be made at such work location. The large number of connections required, and their proximity to one another, causes great difficulty and expense in the arrangement and connection of the tips.

It is an object of the present invention to provide a sub-assembly design whereby a sub-assembly comprising:

(1) Two or four tips
(2) Fluid actuable means for actuating each of said tips into and out of contact with the work piece
(3) An electrical transformer of sufficient capacity to supply such two or four tips
(4) Means connecting such transformer to each of said tips
(5) A water manifold
(6) Supply lines from such water manifold to each of said tips
(7) A fluid manifold
(8) Supply lines from said fluid manifold to each of said fluid actuable means, may be made at the work bench and insulated as a unit along with other such sub-assemblies. Thus the work of connection for the welding tips may be done remote from the work location, and the only work which need be done in such work location is to fix the sub-assemblies in place.

In present apparatus expensive means are required for insuring that the welding tips in their location and in their motion toward and away from the workpiece are arranged to correspond to the desired spot locations. It is an object of this invention to provide a method whereby each of the welding tips and their associated apparatus may be correctly located and molded into location, with a thermosetting compound, although free to move toward and away from the workpiece, and it is a corresponding object of the invention to provide a battery of welding tips and their associated apparatus molded into a predetermined pattern but free to move toward and away from the workpiece. In existing apparatus it is common to actuate the welding tips by hydraulic pressure. The use of hydraulic pressure has been found to have some disadvantages which are well known to those skilled in the art and which would lead to its replacement with pneumatic controls where possible.

It is an object of this invention to provide apparatus with an alternative design wherein the welding tips may be actuated by a compressible fluid rather than hydraulically.

In drawings which illustrate preferred embodiments of the invention:

Figure 1:
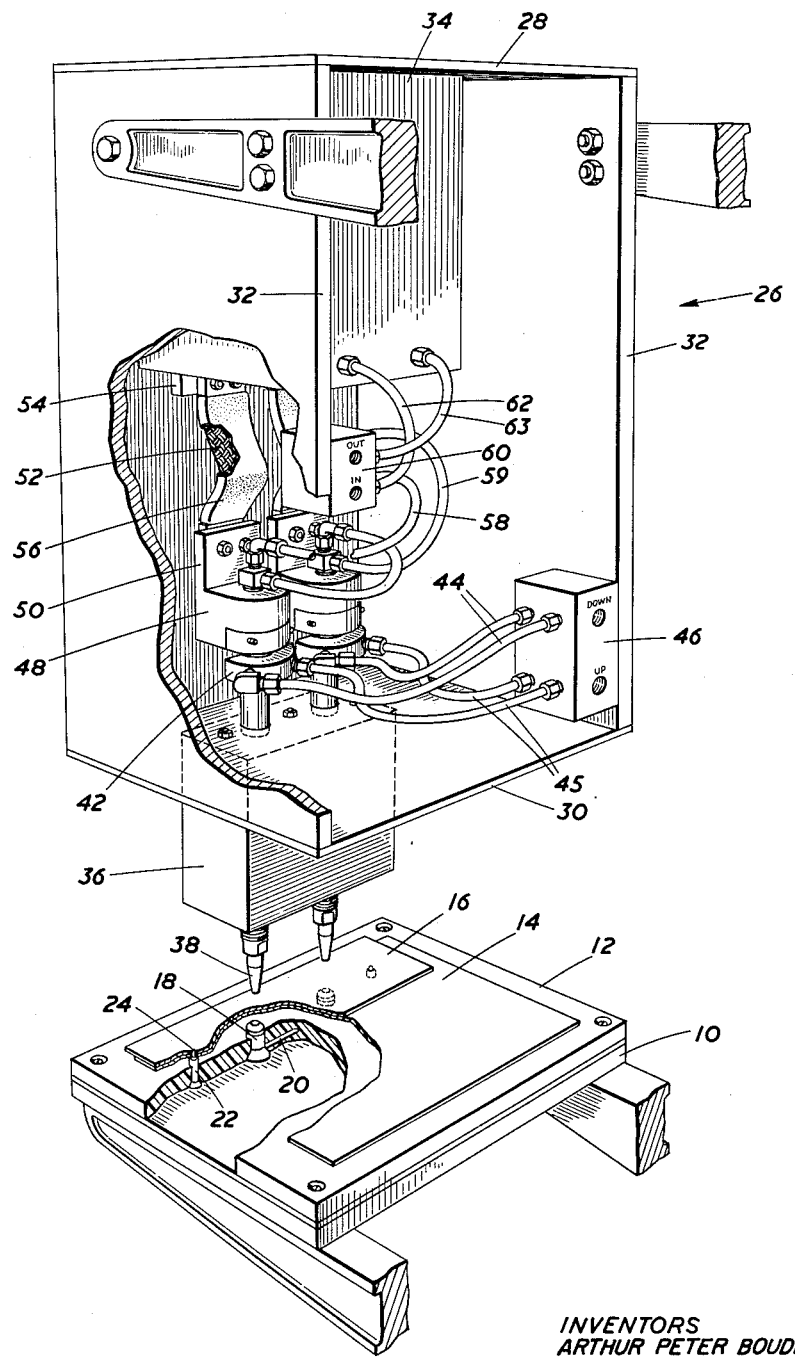
Figure 1 shows a perspective view of a welding machine sub-assembly in accord with the invention, only two welding tips being used to allow for clarity of description.
Figures 2, 3:
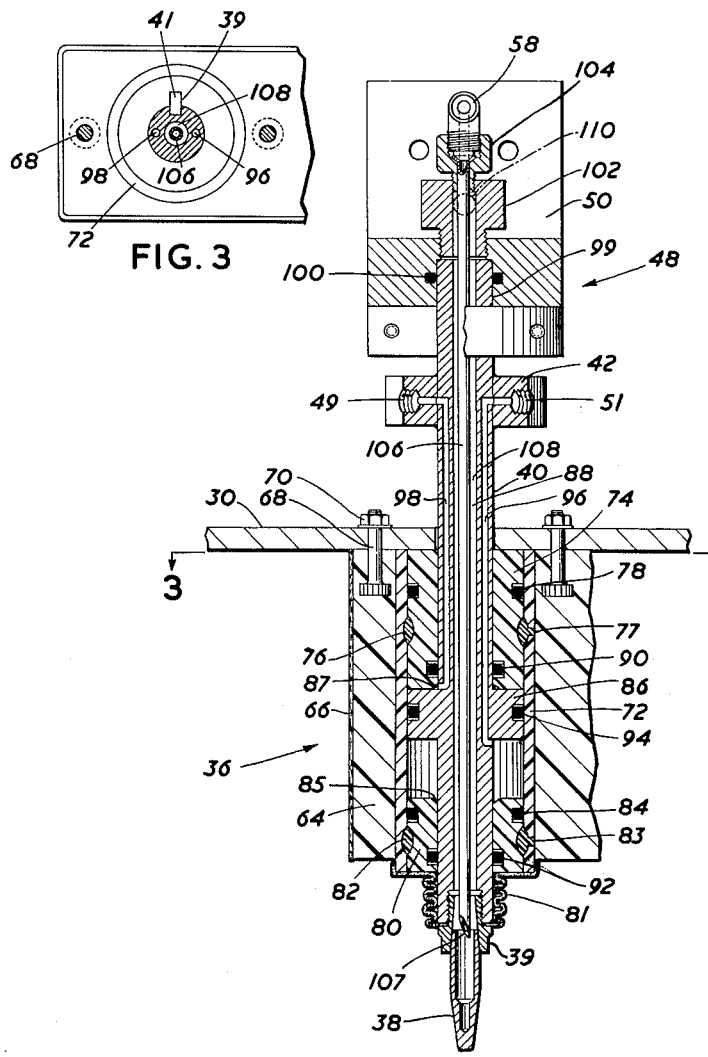
Figure 2 shows a vertical cross-section of a part of the machine of Figure 1.
Figure 3 illustrates a section on the line 44 of Figure 2.

In the sub-assembly illustrated in Figures 1 to 3 a base 10 suitably rigidly supports a panel 12 adapted to receive the workpiece, composed of the members 14 and 16 which are to be welded together. The panel 12 which acts to support the workpiece is preferably of a molded non-conducting plastic having conducting areas on the surface which are provided by embedding welding studs 18 therein, the surface of the studs being flush with the supporting surface of panel 12. Pairs of such welding studs 18 are electrically connected by conducting links 20 which are also embedded in the plastic.

The panel member may be constructed for any specific job by arranging and temporarily supporting studs 18 in the welding spot locations desired for the workpiece. Links 20 are then attached between pairs of such studs 18 and are also temporarily supported in position. A suitable thermosetting plastic composition is then poured into the mold and allowed to set to form the panel member 12 with its supporting surface. Dowels 22 embedded in the panel member and corresponding apertures 24 in the workpiece act to removably retain the workpiece in position during the welding operation.

A housing 26 preferably open on two sides is rigidly mounted spaced from panel 12 in the direction of projection of welding studs 18 therethrough. The housing 26 is provided with top wall 28, bottom wall 30 and opposite side walls 32 but preferably with the other two sides open. Toward the upper part of the housing is mounted a transformer 34 whose output is the source of welding current. On the bottom wall 30 of the housing and projecting therethrough is a small housing 36 carrying the actuating and supporting means for the welding tips 38.

The welding tips 38 are arranged to correspond to the desired arrangement and therefore to correspond to the arrangement of the studs 18 as will be hereinafter described, and are further adapted to be moved toward and away from the studs 18 by the actuating means.

Projecting from the small housing 36 through wall 30 is a conducting shank 40 corresponding to each welding tip 38 and axially aligned therewith. The shank 40 has mounted thereon at the tip-remote end a block 42 which is provided with connecting means for the oil lines 44 for actuating of the welding tips toward and oil lines 45 for actuating said tips away from the workpiece, the oil lines extending from a manifold 46. The manifold 46 is supplied with oil from any suitable source of supply.

On the side of the block 42 adjacent the transformer 34, and mounted on the shank 40 is an electrical terminal block 48 provided with a flange 50 whereon a jumper 52 is connected. The jumper 52 carries the welding current from the transformer 34 to the welding tips and is accordingly attached to a terminal block 54. Since the shank 40 is attached to and moves up and down with the welding tips 38, the jumpers 52 must be long enough to connect to flange 50 in its position remote from the transformer and must flex to absorb the slack when the flange is in its adjacent position. In order to protect adjacent jumpers 52 from swinging toward one another under the forces created by current flow, each jumper is provided with an insulating sheath 56 which supplies the necessary protection to prevent short circuits between adjacent jumpers due to inductive flexure of adjacent jumpers 52 toward one another. The electrical block 48 also forms the connection means for lines 58 and 59 to allow the supply of coolant water to and from the tips 38. It has been found advantageous to construct oil lines 44 and 45 and coolant lines 58 and 59 from a suitable non-conducting plastic preferably nylon. Water lines 58 and 59 are attached at their ends remote from block 48 to a manifold 60 which may be connected to any suitable water source and sink. Manifold 60 is also adapted to supply coolant water to the transformer through lines 62 and 63.

The actuation energization and cooling of the welding tips will be described with reference to Figure 2 of the drawings.

In Figure 2 it will be noted that small housing 36 comprises a body of thermosetting plastic material 64 encircled by a suitable protective cover 66 made of material such as that known by the trademark "Fiberglas." Molded into the appropriate part of the cover are portions of bolts 68 which project from the surface of the molded material, through apertures in wall 30 whereby the small housing 36 may be mounted in place by bolts 70. A piston cylinder extending through the molded material and supported through substantially all of its length thereby in the direction of a welding tip 38 and stud 18 is provided corresponding to each welding spot location and is defined by a wall of plastic tubing 72. The chamber in the piston cylinder is preferably defined at the end remote from tip 38 by a nylon block 74. Opposite concavities in the contacting walls of block 74 form a keying chamber 76 preferably extending around the block and into which thermosetting plastic may be poured through an aperture 77 in the tubing 72 before assembly thereto.

The plastic tubing 72 may be similarly fixed in position in the thermosetting plastic 64 by providing concavities (not shown) in the outer surface of the tube ringing the tube into which thermosetting plastic materials may flow to firmly fix the tube in position.

Returning to the construction of the piston cylinder, a sealing ring 78 housed in a groove in the outer wall of block 74 prevents leakage from the piston cylinder around the walls of the block.

The piston cylinder chamber is defined adjacent the tip 38 preferably by a block 80 maintained in place by a keying ring of thermosetting plastic 82 poured through an aperture 83 in the wall 72 and lying in concavities in the contacting surfaces of block 80 and wall 72.

A sealing ring 84 housed in a groove in the outer wall of block 80 prevents leakage from the piston cylinder around the walls of the block. An accordion sleeve 81 joins the outside of fixed tube 72 and the space between tip 38 and movable shank 40 to prevent the ingress of dirt and oil between shank 40 and block 80.

Bottom wall 30 of the main housing, block 74 and block 80 are all apertured for slidable reception of the conducting shank 40, the shank being preferably constructed of copper and extending through the cylinder. Attached thereto and slidable longitudinally therewith is a piston 86 slidable in the cylinder and on the walls of the tube 72.

Block 74 and shank 40 are preferably keyed as shown at 41 in Figure 3 or in any convenient manner to prevent relative rotation between shank 40 and the piston cylinder.

The shank 40 threadedly mounts the welding tip 38 by means of an adaptor and shank 39 which is threadedly received in the shank 40 and which threadedly receives the tip 38. The shank 40 is provided with the central bore 88 which is continued through adaptor 39 and into tip 38 and to within a short distance of the outer extremity of the tip. The tips 38 must, in operation, be changed quite often. Such changes cause wear in the member to which the tips 38 are attached. Thus the adaptor 39 is provided so that it may from time to time be removed and replaced and thereby the necessity of removing and replacing the shank is avoided. The shank 40 is provided with a central bore 88 which is continued into tip 38 and to within a short distance of the outer extremity of the tip. The central bore 88 is open to the surface of the shank 40 at aperture 110 at the end remote from the tip for connection to the water coolant line 59 and is closed at its end adjacent the tip by the tip material itself.

Sealing rings 90 and 92 mounted on blocks 74 and 80 respectively, adjacent the shank 40 prevent leakage between these members and the shank; and sealing ring 94 mounted on the outer periphery of piston 86 prevents leakage between this member and the tube 72.

The piston 86 movable with the shank 40 is designed to move in a range approximately defined by the blocks 74 and 80. The shank 40 is provided with a bore 96 extending longitudinally thereof from a point on the side of the piston 86 adjacent block 80 (where it opens into the piston cylinder) to an aperture 49 in block 42 for connection to oil line 45. The movement of the piston and the location of the opening from bore 96 to the piston cylinder is designed so that the opening will connect with the cylinder in any position of the piston. A preferred means of accomplishing this is hereinafter described.

The shank 40 is provided with a further bore 98 extending longitudinally thereof from a point on the side of the piston 86 adjacent block 74 (where it opens into the piston cylinder) to an aperture 51 in block 42 for connection to oil line 44.

The movement of the piston and location of the opening into the piston chamber from the bore 98 is so designed that the opening connects with the chamber in any position of the piston. A preferred means for accomplishing this is hereinafter described.

The bore 96 is provided to allow the flow of a supply of oil to the piston cylinder on the tip-adjacent side of the piston 86 and under the impulse of the oil pressure to move the piston 86, shank 40 and tip 38 away from the workpiece. In order to allow oil supply through the bore 96 to initiate piston movement if the piston 86 is seated in block 80, the seating surface of block 80 is chamfered away from piston 86 adjacent shank 40 to provide an annular ring 85 for initial oil flow.

Similarly the oil line 98 is provided to allow the flow of a supply of oil under pressure to the piston cylinder on the tip-remote side of the piston 86 in order to move the piston 86, shank 40 and tip 38 toward the workpiece. In order to allow oil supplied to the bore 96 to initiate piston movement if the piston 86 is resting against the surface of the block 74, the surface of block 74 which faces its counterpart block 80 is chamfered away from piston 86 adjacent shank 40 to provide an annular ring 87 into which the oil may flow from the opening of bore 98 to initiate movement of the piston.

The shank 40 is rigidly attached to block 48 and rests in the bore 99 in the block with leakage between the walls of shank and block prevented by sealing ring 100. Bore 99 is continued through the block 48 in a direction away from the welding tip 38 and in its tip-remote extent threadedly mounts a coupler 102.

The coupler 102 contains a continuation of the bore 96 closed at the end remote from welding tip 98 by an adaptor 104. The adaptor 104 at the tip-remote end is coupled to the water supply line 58 and on the tip-adjacent end mounts a tube 106 connected thereto, the tube extending centrally, axially down the bore 88 to an open end 107 just short of the bore extremity in the tip 38. The space 108 between the tube 106 and the walls of bore 88 defines an exit passageway for the coolant water which at the end of bore 88 remote from tip 38 is connected to outlet port 110 for connection to the water line 58.

As shown, the coolant lines through the guns are connected in series, that is the water supply line from manifold 60 is supplied through adaptor 104 to one welding tip unit and the output from the unit through port 110 is connected to adaptor 104 of the next unit, and so on. In installations where a large number of guns are used, the water after passing through a series of units may lack the cooling capacitor required, and it may therefore be desirable to make connections so that the units are parallel as far as the water supply is concerned so that supply lines and exit lines radiate from manifold 60 to each of the units. In complicated arrays it will be obvious that a combination of series and parallel connections may be used.

Figure 4:
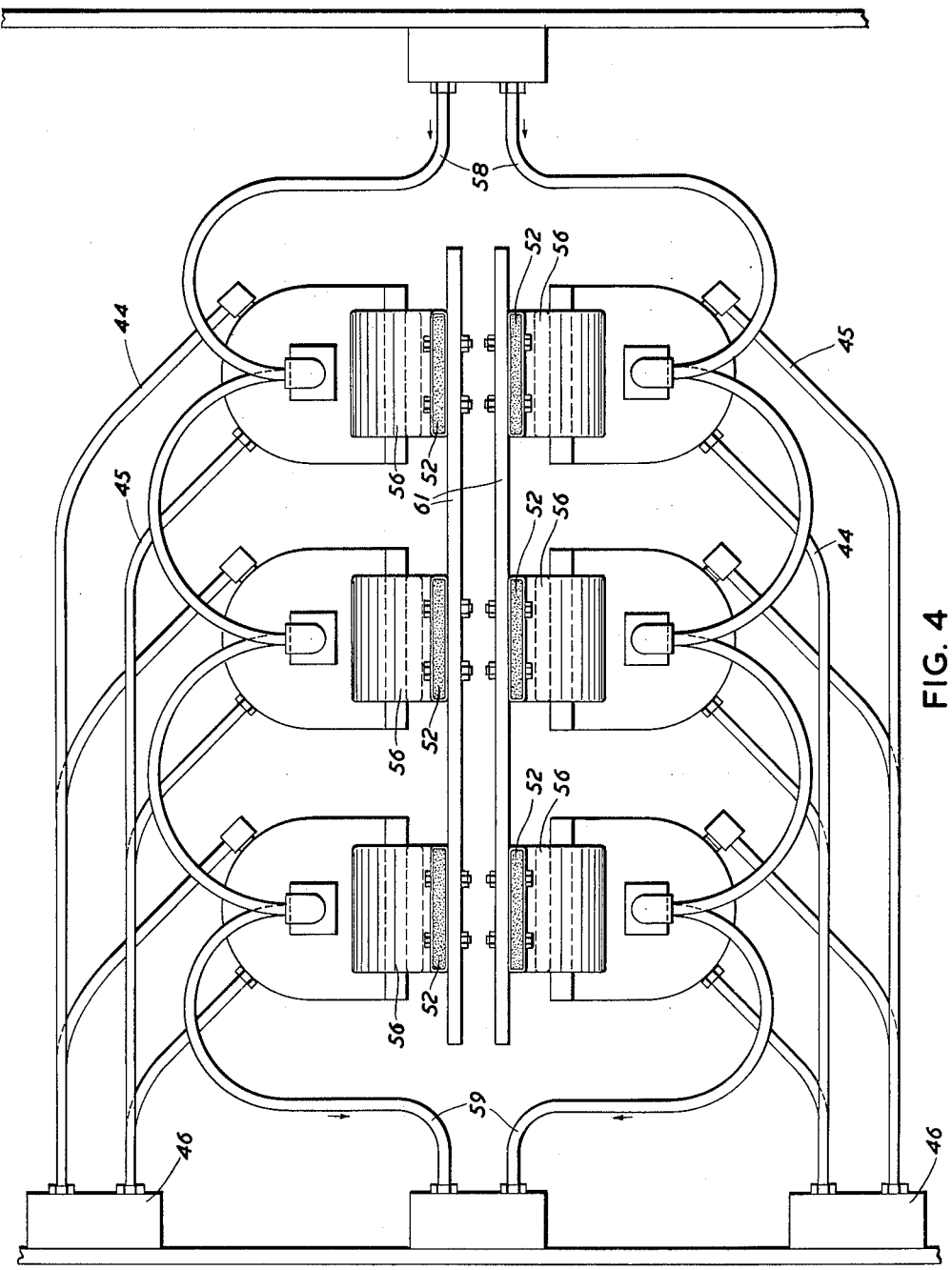
Figure 4 shows a planned view of a welding machine using a battery of six welding tips but operating in accord with the apparatus of Figure 2.

In Figure 4 is shown a plan view of six units of the type illustrated in Figure 2. The array will weld at six spot locations and in the drawing the spot locations are arranged in two rows of three. However, it will be obvious that the spot locations will be arranged in any desired pattern and that the units will be provided in any desired number for the particular workpiece to be welded. It will be noted that the transformer is provided with a pair of bus bars 61 to supply respectively the positive and negative transformer terminals for jumpers 52. It should also be noted that the bus bars each serve a row of three units so that the conduction in the supporting member 12 would in such arrangement be between opposite members of the two rows. It should further be noted that the jumpers 52 of each unit are designed to flex outwardly away from the opposite unit to avoid undesirable inductive effects. The water and oil lines are led from the units in each row away from the units in the opposite row. It will thus be seen that the design allows easy access to the terminals of any of the oil or electric lines adjacent the units. This feature combined with the feature most clearly shown in Figure 1 of connecting all such lines in a location remote from the welding tips makes welding machines constructed in accord with this invention easy to adjust and maintain.

Referring to the oil connections of the array in Figure 4 it will be seen that two manifolds 46 supplies oil individually to each of the units through a pair of lines 44 and 45. Referring now to the water connections, 58 and 59, it will be seen that the three units in each row are connected in series and that the rows themselves are connected in parallel with one another. It will be obvious however, that any arrangement of series or parallel can be used subject to proper operating conditions and to the avoidance of undue complexity in the water connections.

The operation in accord with the invention is as follows:

The welding tips 38 when not in use are in the position remote from the welding studs 18. To use the apparatus each pair of tips 38 is energized by the supply of electricity thereto through a jumper 52 and copper shank 40. The shank 40 and tips 38 of each unit, are adapted to be cooled by the coolant water flowing down bore 106 and up bore 108. The tips 38 and shank 40 of each unit, are actuated toward the workpiece by the supply of oil through a respective bore 98 to the tip-remote side of the piston. Under such movement and on contact with the workpiece, current will flow from one tip 38 through the workpiece, performing a weld thereon, to stud 18, across a connector 20 to another stud 18, through the workpiece, performing a weld thereon, to the corresponding other tip 38. The welding operation being completed, oil is supplied through a bore 96 of each unit to the tip-adjacent side of the respective piston and withdrawn through bore 98 to move the piston 86, shank 40 and tip 38 away from the workpiece.

It will be noted that the tube 72, thermosetting material 64 and cover 66 being the materials surrounding the conducting path are all of non-magnetic, non-conducting material. This construction avoids undesirable heat and magnetic losses.

Figure 5:
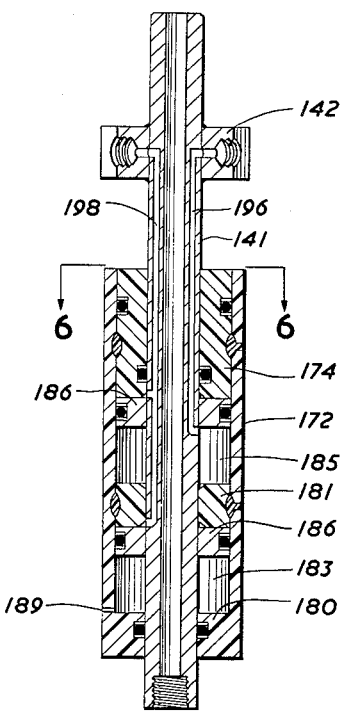
Figure 5 illustrates an alternative to the design shown in Figure 2.
Figure 6:
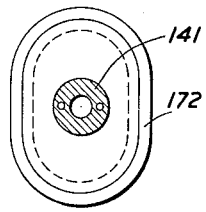
Figure 6 illustrates a cross-section of the apparatus shown in Figure 5.

The embodiment of the invention illustrated in Figures 5 and 6 is an alternative to the unit shown in Figures 2 and 4. The unit of Figures 2 and 4 is designed for use with a hydraulic fluid. The unit of Figures 5 and 6 is designed for use with a compressible fluid. As illustrated in Figures 5 and 6, a piston cylinder 172 is provided with an upper block 174 and a lower block 180 but in between is provided with a divider block 181 which acts to define two chambers 183 and 185 which are intended to act as tandem piston chambers. The shank 141 otherwise similar to the shank in Figure 2 is provided with tandem pistons 186 adapted to slide with the shank and to ride in the respective chambers. Bore 196 for supplying compressible fluid to move the pistons and shank away from the workpiece is designed to open only into chamber 185. The bore 198 for the supply of compressible fluid to move the pistons toward the workpiece is provided with inlets to both chambers on the tip-remote side of the piston. The tandem chambers provide in effect a double piston area to supply the pressure to be applied during the welding operation. The connections for the compressible fluid and the electrical and coolant connections are substantially similar in Figure 5 to those illustrated in Figure 2.

Figure 6 illustrates an optional form of the cross-section for the device shown in Figure 5 but the form of Figure 6 could be used for the apparatus shown in Figure 3 also. By providing an oval piston cylinder, the necessity of keying means 41 between the shank 40 and the piston cylinder members is avoided. Moreover the oval shape allows an increase in the piston area without an increase in both directions of the diameter of the piston cylinder. Thus the oval diameter may be used to obtain a desired piston area without an undesirable piston diameter in a direction which would cause undue crowding of the units. Thus in the embodiment shown in Figure 3, the array of six units might be provided with oval cylinders with the long diameter of the oval oriented so that the pistons could be placed closely together in whichever direction was desirable.

Figure 7:
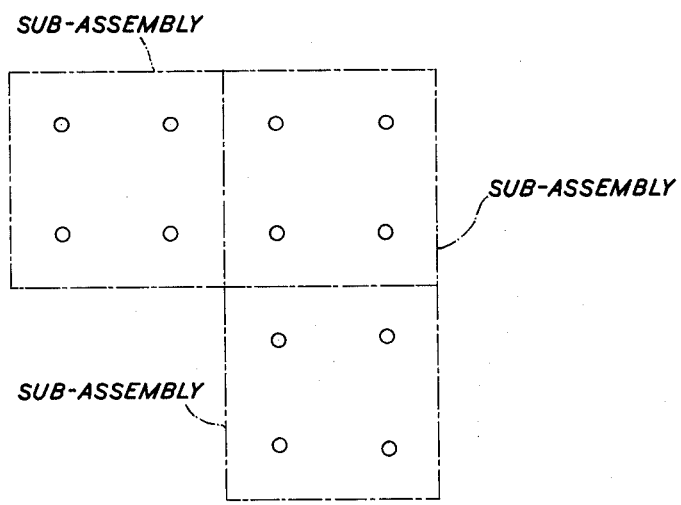
Figure 7 illustrates schematically a number of sub-assemblies arranged to conform to a spot pattern.

The sub-assembly shown in Figure 1 containing the details or alternatives as shown in Figures 2–6 may be combined with other such assemblies to reproduce a complex spot pattern as illustrated in Figure 7. All the connections for each of the sub-assemblies can be made remote from the work locations and the individual sub-assemblies are then brought to the work area and suitably fastened in place. It is then only necessary to connect the transformer, water manifold and fluid manifold of each sub-assembly to suitable respective: electric, water and fluids supplies.

What we claim as our invention is:

1. In a welding machine having a surface for supporting a workpiece to be welded at at least one spot; a shank corresponding to each of said spots located to extend toward said workpiece on the side thereof remote from said surface; welding tips attached to the ends of said shanks adjacent said surface, means for moving said shanks relative to said support surface, to bring said tips into and out of contact with said workpiece; and means for causing electric current to flow between said tip and said workpiece, wherein said means for moving said shanks comprises: a piston cylinder rigidly mounted relative to said surface corresponding to each of said spots having its axis directed toward said spot, said cylinder being located on the side of said workpiece remote from said surface, said cylinder being closed at either end by members each having a central bore therein to allow slidable movement in said bore of a shank extending through each of said cylinders, a piston mounted on each said shank to move longitudinally therewith, said piston being designed to be contained in the respective piston cylinder and to be slidable on the walls thereof, a first bore in said shank extending from a location adjacent the tip-remote end thereof to an opening on the surface of said shank on the tip remote side of said piston; means for ensuring that said opening will connect to the inside of said cylinder in any position of said piston; a second bore in said shank extending from a location adjacent the tip-remote end thereof to an opening on the surface of said shank on the tip-adjacent side of said piston; means for ensuring that the opening will connect to the inside of said cylinder in any position of said piston; and means for supplying fluid under pressure to either one of said bores adjacent the tip-remote end thereof and for simultaneously receiving fluid from the other one of said bores adjacent said tip-remote end, and wherein said cylinder is so located relative to the intended position for said workpiece that movement of said piston brings said tip into and out of contact with such workpiece.

2. A device as claimed in claim 1 wherein said cylinder is made of non-magnetic material.

3. A welding machine as claimed in claim 1 wherein said fluid supplied is hydraulic fluid.

4. A welding machine as claimed in claim 1 wherein said fluid supplied is compressible.

5. In a welding machine as claimed in claim 1 wherein said piston and the inside cross-section of said cylinder are non-circular.

6. In a welding machine having a surface for supporting a workpiece to be welded at at least one spot; a shank corresponding to each of said spots located to extend toward said workpiece on the side thereof remote from said surface; welding tips attached to the ends of said shanks adjacent said surface; means for moving said shanks relative to said support surface, to bring said tips into and out of contact with said workpiece; and means for causing an electric current to flow between said tip and said support on said contact, wherein said means for moving said shanks comprises: a cylinder, rigidly mounted relative to said supporting surface corresponding to each of said spots, having its axis directed toward the respective spot and being located on the side of the intended workpiece position remote from said surface; blocks closing each end of said cylinder and a block located between said blocks dividing said cylinder into two chambers, each of said blocks being provided with a bore therein to allow slidable movement therethrough of a shank extending through each of said cylinders and said blocks; pistons mounted on said shank in each space between a pair of blocks, said pistons making a sliding fit with the walls of said cylinder, said pistons being so mounted as to move axially with said shank; a first bore in said shank extending from a location adjacent the tip-remote end thereof to the surface of said shank at the tip-remote side of each piston means for ensuring that the openings will connect to the inside of the respective chambers in any position of said pistons; and a second bore in said shank extending from the tip-remote end thereof to the surface of said shank at the tip-adjacent side of said piston means for ensuring that the openings will connect to the inside of the respective chambers in any position of said pistons; means rigidly mounted relative to the supporting surface for supplying fluid under pressure to either one of said bores and for receiving fluid under pressure from the other one of said bores, and fluid connections from said means to said bores sufficiently flexible to allow for relative movement between said shank and said fluid pressure means, and wherein said cylinder is so located relative to said workpiece that movement of said piston therein brings said tip into and out of contact with said workpiece.

7. A welding machine as claimed in claim 6 wherein each of said blocks and said cylinder are provided with grooves facing one another, said grooves being filled with thermosetting plastic to fix said blocks in position in said cylinder.

References Cited in the file of this patent

UNITED STATES PATENTS

| | | |
|---|---|---|
| 2,013,585 | Sciaky | Sept. 3, 1935 |
| 2,389,324 | Pedley | Nov. 20, 1945 |
| 2,399,753 | McLarn | May 7, 1946 |
| 2,465,456 | Johnson | Mar. 29, 1949 |
| 2,631,215 | Randall et al. | Mar. 10, 1953 |
| 2,714,150 | Kaiser | July 21, 1955 |
| 2,765,395 | Kurth et al. | Oct. 2, 1956 |

FOREIGN PATENTS

| | | |
|---|---|---|
| 458,197 | Great Britain | Dec. 15, 1936 |
| 677,449 | Great Britain | Aug. 13, 1952 |